INVENTOR.
ARMIN ELMENDORF
BY Townsend and Townsend
ATTORNEYS

Feb. 7, 1967  A. ELMENDORF  3,302,848
FOLDABLE STRUCTURAL SHIPPING CONTAINER
Filed Oct. 1, 1965  2 Sheets-Sheet 2
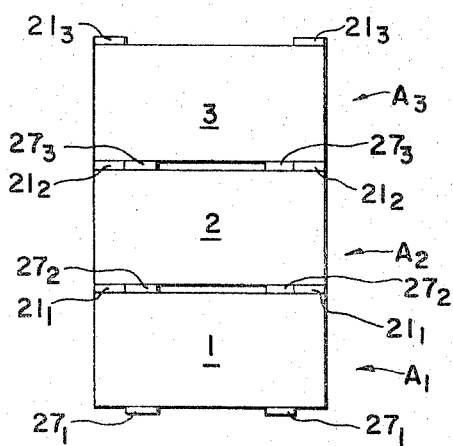
FIG. 5
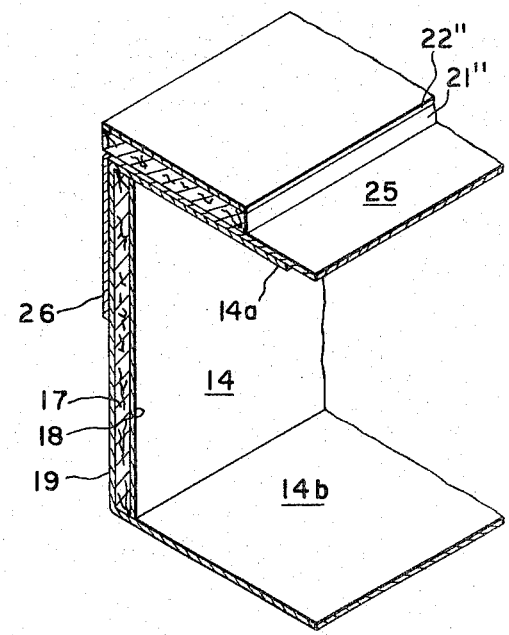
FIG. 4
FIG. 6
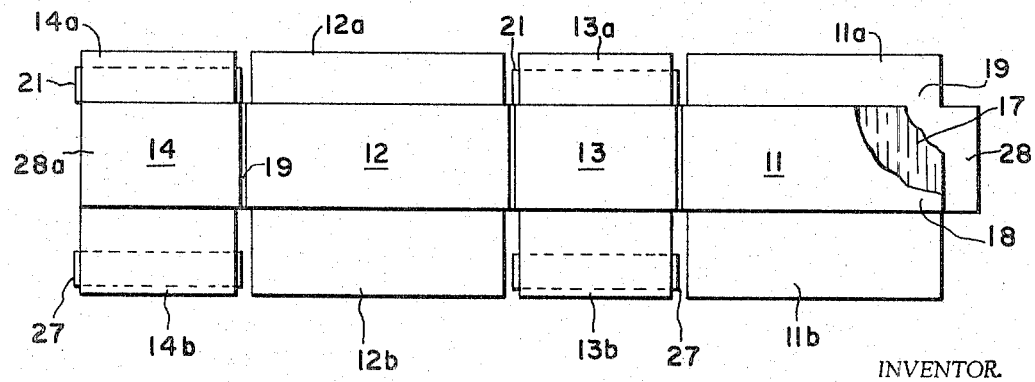
INVENTOR.
ARMIN ELMENDORF
BY Townsend and Townsend
ATTORNEYS

United States Patent Office 3,302,848
Patented Feb. 7, 1967

3,302,848
FOLDABLE STRUCTURAL SHIPPING CONTAINER
Armin Elmendorf, Portola Valley, Calif., assignor to Elmendorf Research, Inc., Palo Alto, Calif.
Filed Oct. 1, 1965, Ser. No. 492,156
5 Claims. (Cl. 229—23)

The present invention relates to a shipping container, and more specifically to a foldable structural shipping container suitable for use in moist environments and for the shipment of commodities in a wet state as well as for storing the same when the containers are stacked, one on top of the other, in high stacks, without subjecting the contents of the containers to pressure.

Broadly stated, the present invention, to be described in greater detail below, is a container made up of wall members substantially enclosing a hollow rectangular parallelepiped, the sides and ends of the container including a wood veneer with the grain in the vertical position extending between the top and bottom, and a liner of lignocellulosic fibers bonded to the outer surface of the side and end veneers and folding over the top and bottom end-grain surfaces of these veneers in intimate contact with these surfaces to form overlapping end and side flaps of the top and bottom of the container, and a pair of wooden cleats at the top of the container, hingedly connected to the container ends, each cleat overlying at least a substantial portion of the top end-grain surface of one end veneer and at least a substantial portion of part of the top end-grain surface of each side veneer. In one form the bottom flaps are also provided with cleats so positioned that the ends of the cleats fall over the veneer in the container sides and the inner edge is near the outer edge of the cleat of the top flap of the container below, thereby facilitating nesting of the containers when they are stacked. In all forms of the container the stacking load is concentrated on the cleats serving as platforms, and these transmit the load to the veneer of the ends and sides and from there to the next lower cleats and so on down the stack, completely freeing the contents of all containers from pressure.

Commodities such as fruit and vegetables contain moisture and when stored in boxes subject the container to humidified air which, in turn, affects the moisture content of the material of which the container is made. Most shipping containers are made either of wood or wood fiber board, hence they are hygroscopic and their moisture content increases upon exposure to high humidity. With increasing moisture content goes a reduction in strength. Ventilation of the fruit in a container is therefore desirable and generally practiced. While the strength of wood falls off slightly with increeasing moisture, the strength of fiber cartons falls off much more. One of the purposes of the present invention is to take advantage of this property of wood.

The strength of wood in the direction of its grain is very much higher than the strength across the grain. Almost all wood boxes as now made are made of boards positioned horizontally so that the wood is subject to compression across the grain when the boxes are stacked in storage. The great strength of wood in the direction of the grain is not being utilized. One purpose of the present invention is to take advantage of the great compression strength of wood in the direction of the grain.

Some vegetables are best shipped by keeping them cool with crushed ice. Poultry is currently also shipped in this manner in wood veneer boxes bound with wires. Another purpose of the present invention is to provide a container which does not disintegrate in the presence of water from melting ice and which retains most of its stacking strength when completely soaked.

Fruit packed in fiber cartons if kept in cold storage and then placed in a warm room will "sweat," and the resultant condensation softens the container and so reduces its strength. It is desirable, therefore, if possible, to construct fiber containers so that they will survive wetting from condensation and not be weakened appreciably thereby. The container of the present invention is not materially weakened if it gets wet, being constructed of wood in the parts that are subjected to high compression in use.

When boxes packed with produce are placed in cold storage in high stacks, the bottom boxes may be called upon to support a load as high as 800 lbs. Only wood boxes as now constructed are strong enough to support a load of this magnitude. Such boxes are heavy and for that reason add substantially to the cost of transportation of the produce shipped.

As most wood boxes are used only one time they are a substantial drain upon an important natural resource of the country, namely, its timber. A reduction in the amount of wood used reduces not only shipping costs, but it conserves the timber resources of the country. These are some of the indirect benefits that would accrue from an extensive use of the present invention.

A major problem associated with wood containers is the time required for setting them up to receive their contents, in contrast with the speed with which slotted fiber cartons can be unfolded and set up. Fiber cartons are almost all designed so that they can be folded flat for shipment to the packer who, in turn, unfolds them and fills them with the commodity to be shipped. "Setting up" a folded carton takes very little time compared to the time required for nailing together the component boards of a wood box. Moreover, the manufacturing cost of the fiber carton is low. A modern high speed scoring, slotting and folding machine may make three or four corrugated fiber cartons per second.

One of the purposes of the present invention is to provide a container made largely of wood that can be shipped folded in a manner resembling a slotted fiber carton. Other purposes are to produce a container having high stacking strength and which cannot only be shipped folded but also requires no nailing in setting up, and can be manufactured by automatic machinery.

The container of the present invention combines wood in its natural state, with fiber board or thick paper in one or more layers in such a manner that each of the requirements or properties listed above is met. In the container, wood in the form of thick veneer is placed in vertical position in the sides and ends to receive superimposed loads parallel to the wood grain thereby utilizing the high compression strength of wood. Also, the container utilizes thick paper where hinge-like bending to a sharp angle is required, and combinations of veneer and paper to avoid splitting where splitting resistance is necessary. The aim is a balanced construction in which each component of the container possesses those strength properties needed in it without unnecessary or surplus weight and strength.

In some forms the container must provide visibility of the contents for display or inspection purposes. In other forms the container must provide good strength when it is wet. Means for ventilating the container must be provided, and means for lifting. The container must be opened easily for inspection.

In accordance with the present invention cleats are provided at the top of the container extending over the top end-grain surface of the container ends and container sides for transmitting the load to the ends and sides. These cleats are substantially wider than the thickness of the veneer in the sides and ends to avoid the necessity of exact alignment of each container over the container below. Exact alignment is difficult as the veneer is seldom more than 3/16 inch thick. A platform must be provided. In one embodiment of the invention these cleats are secured to the top flaps of the end and fold therewith in hinge-like manner to overlie the top end-grain surfaces of the veneer in an end and the veneer in the adjacent sides. This cleat can extend outwardly beyond the profile of the container to provide a grip for picking up the container as well as to broaden the area of support for the container above, should the box alignment be faulty. Alternatively, the cleat can be secured to a separate container cover or telescoping lid and positioned on the lid to extend over the veneer in the ends and sides as described.

In accordance with another form of this invention, cleats are also fastened to the end flaps at the bottom of the container offset from the location of the top cleats on the container below for nesting the containers in a vertical stack, should nesting be desired to avoid shifting in a freight car.

Other objects and advantages of this invention will become apparent when reading the following description and referring to the accompanying drawing in which similar characters of reference represent corresponding parts in each of the several views.

In the drawings:

FIG. 4 is a view similar to FIG. 3 illustrating still another form of the present invention in which a separate lid in used;

FIG. 5 is a side elevational view of a stack of containers constructed in accordance with one form of the present invention; and FIG. 6 is a plan view, partially in phantom, illustrating a container constructed in accordance with the present invention as illustrated in FIG. 5 in the form of a blank prior to folding to join the ends.

Figure 1:
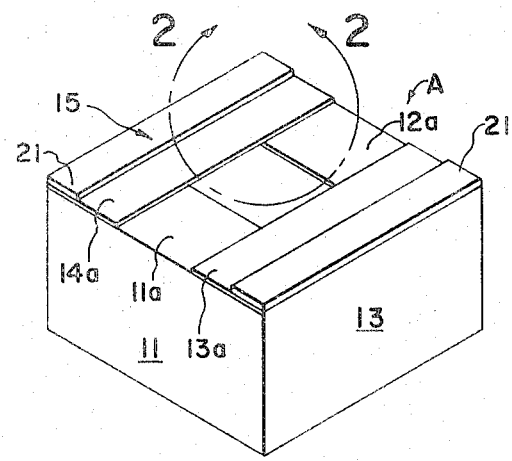
FIG. 1 is a perspective view of a container constructed in accordance with one embodiment of the present invention.
Figure 2:
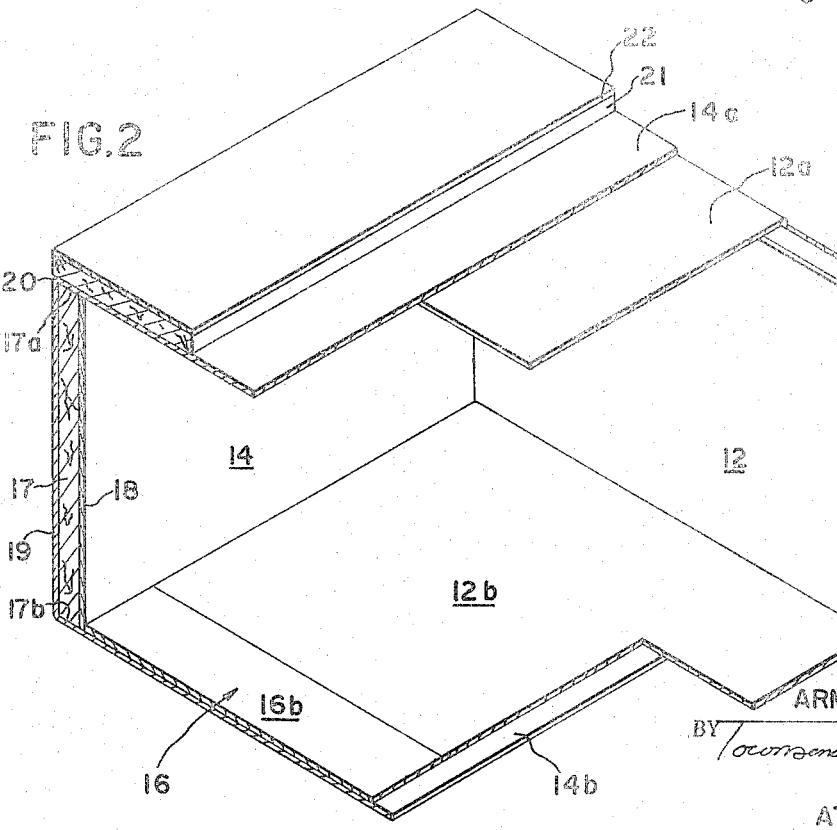
FIG. 2 is an enlarged perspective view, partially in section, of a portion of the structure illustrated in FIG. 1 and delineated by line 2—2.

Referring now to the drawings with particular reference to FIGS. 1 and 2, there is illustrated a container A constructed in accordance with the present invention. It permits stacking of a large number of such containers without crushing the contents of the container. As illustrated, the container takes the form of a rectangular parallelepiped having sides 11 and 12, ends 13 and 14, a top 15, and bottom 16. The sides and ends 11–14 include a layer of veneer 17 oriented so that the grain of the veneer is vertical and extends from the top 15 to the bottom 16. To improve the flatness the veneer may be stress-relieved. Stress-relieving may be achieved by rupturing the veneer as described in U.S. Patent No. 2,974,697. Stress-relieving the veneer results in a flatter panel when the panel gets wet and subsequently dries, and facilitates manufacture of the panel. Typically, the veneer 17 is a single layer generally not over 3/16 inch thick, with its upper and lower end-grain surfaces 17a and 17b squared off for supporting superimposed loads, as will be described in greater detail below. The inside surface of each of the veneers 17 of the sides and ends of the container 11–14 is preferably covered with a sheet of paper such as, for example, 33 pound Clupak paper bonded thereto so as to prevent splitting.

An outer lining paper 19 of ligno-cellulosic fibers such as kraft liner board of the high-wet-strength type weighing from 70 to 100 pounds per M square feet surrounds the container A at the side and end walls and is bonded to the outside surface of the side and end veneers. This paper 19 extends above and below the height of the sides and ends 11–14 as shown in FIG. 6, and is folded over the top and bottom end-grain surfaces 17a and 17b of the side and end veneers 17 to form overlapping end and side flaps on the top and bottom of the container. For the sides and ends 11–14 the top flaps are designated 11a–14a, respectively, and the bottom flaps are designated 11b–14b, respectively. With this paper or board 19 lightly scored at the outer edge of the top and bottom surfaces 17a and 17b of the veneer, the liner 19 is readily bent with a hinge-like bend 20 to a sharp right angle over these edges to make firm contact with the surfaces 17a and 17b. The flaps even though made of only a single layer of liner board, when bent to a right angle, stiffen the side and end walls and reduce any lateral bending that might occur due to lateral pressure.

Typically, the extension of the liner beyond the veneer 17 provides flaps 11b–14b which when folded over the bottom end-grain surfaces 17b of the veneer 17 completely close the bottom of the container as in conventional corrugated fiber boxes. The bottom flaps 11b–14b may be bonded together or stapled as desired. The top flaps 11a–14a may extend inwardly any distance desired such as either the same distance as that of the bottom to close the top of the container, or a lesser distance, thereby providing a window in the top for exposing the box contents to view.

It should be noted that a corrugated fiber board consists of two lining papers separated by a corrugating medium. If properly scored to produce a right angle bend, it may be used in place of the single liner 19, but such a board has the disadvantage of requiring considerable compression at the box corners where the flap of the box side overlaps the end before the desired firm contact with the end grain wood is achieved. I have found that a single layer of lining paper can be used and that it affects a substantial saving in materials.

A wooden cleat 21 preferably made of veneer faced with paper is provided on the top of the closed container at each of the ends thereof. The cleats 21 are bonded or mechanically fastened as by staples to the top surface of the top end-flaps 13a and 14a so as to overlie the top end-grain surfaces 17a of the ends 13 and 14, respectively, and part of the top end-grain surface 17a of the sides 11 and 12 when the top flaps 11a–14a are bent over to form the top of the contained. With the cleats 21 so positioned, the weight of a similar container placed on top of the container A is supported by the cleats 21 and transmitted by these onto the veneers 17 of the container ends and sides. As the veneer 17 has its grain in the vertical direction it provides great column strength and resistance to collapse, thereby not only carrying a large stacking load but also preventing the transfer of any of the load to the contents.

Since the wood of the box sides and ends is thin, generally only from 1/8 inch to 3/16 inch, it is difficult to position one container A exactly over another such container so that the walls of the upper box line up exactly with those of the lower box. If no cleat platforms are provided to take care of misalignment, the entire load of a stack of boxes may be directed adjacent to the supporting walls of the bottom box causing the top of that box to cave in with disastrous consequence, since the stack may be from 20 to 30 boxes high. With the cleat 21 fastened to the top end flaps 13a and 14a as illustrated in FIGS. 1 and 2 so that when the flaps are in horizontal position the cleat is supported on three vertical veneers, a cleat platform is provided which avoids the necessity for exactness in positioning one box on top of another. Where a gap exists between a vertical wood member and the core of a top panel as in U.S. Patent 2,693,894, proper orientation between the cleat and the supporting end-grain surface is not assured, and under a heavy stacking load the top of the container may collapse.

Figure 3:
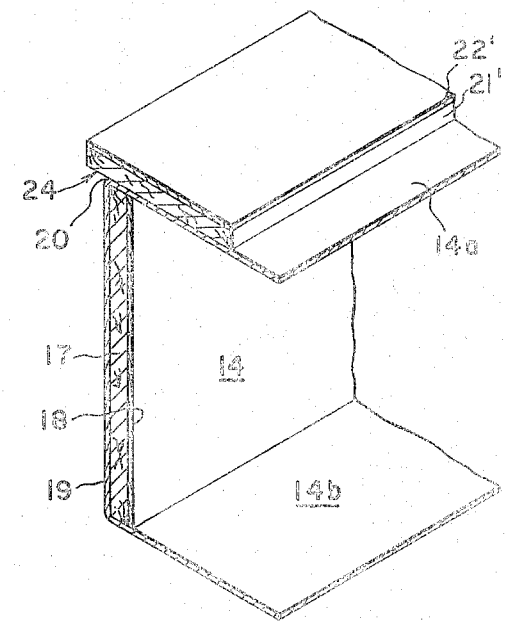
FIG. 3 is a perspective view, partially in section, of a portion of a container made in accordance with another form of the present invention.

In accordance with another aspect of the present invention, illustrated in FIG. 3, the outer edge of the cleat 21 can extend beyond the profile of the container, that is beyond the liner hinge 20 to provide a lip 24 which projects outwardly beyond the box end for a short distance. This construction permits the placing of the next box so that the downward thrust of its end wall may fall outside as well as inside the wall of the box beneath. This construction also has the further advantage of providing a ledge for lifting the box. The disadvantage of this construction over that shown in FIGS. 1 and 2 lies in the fact that the top flaps of the box can only be folded upwardly from the closed position to a vertical open position and cannot be bent further to a horizontal position as in the construction of FIGS. 1 and 2.

In another construction the cleat which transmits the weight of the superimposed containers onto the veneer in the side and end walls may be secured to a telescoping lid which fits over the top of the container as illustrated in FIG. 4. The cleat may be fastened to either the outer or inner surface of the top of the lid. It must be positioned on the top so that when the lid is in place the cleat lies over the veneer of the container ends and the sides in the same manner as when it is fastened to the flaps of the container ends. The cleat $21''$ is secured to the covering member 25 on either the top or bottom surface thereof and is located so as to overlie the end-grain surface $17a$ of the veneer wall 17. The lid may be made of any conventional material such as liner board, cardboard or corrugated board.

In accordance with still another aspect of the present invention as illustrated in FIG. 5, the containers $A_1$, $A_2$, and $A_3$ are each provided with a pair of bottom cleats 27 illustrated as $27_1$, $27_2$ and $27_3$, respectively. The cleats 27 are secured to the end-flaps of the bottom of the containers as, by gluing or stapling in such a position as to be adjacent to the top cleats 21 of the container next beneath, thereby nesting the containers. The top cleats 21 are designated by $21_1$ $21_2$ and $21_3$ for the containers $A_1$, $A_2$ and $A_3$, respectively. This construction permits nesting of the containers for alignment in at least one direction and prevents shifting of the container in a freight car.

FIG. 6 illustrates a blank for the container of the type shown stacked up in FIG. 5. It shows the container unfolded. The veneers 17 lie in the central portion of the panels on the upper surface of the liner 19, and the paper 18 is on top of the veneer as shown. The top cleats 21 are on the under surface of the liner and are attached to the top flaps $13a$ and $14a$, and the bottom cleats 27 are on the under surface of the liner attached to the bottom flaps $13b$ and $14b$. An extension 28 is provided for the conventional "manufacturers corner." Before assembling the container the extension 28 is fastened by gluing or stapling to the opposite edge $28a$. The container is then in position to bend the bottom flaps into horizontal position and to fasten them together in that position. It is then ready for filling.

Containers constructed in accordance with the present invention have been tested for strength. A box of grape lug size made as shown in FIG. 1 of ⅙ inch Douglas fir veneer that had been stress-relieved and faced on the outside with 90 lb. high-wet-strength kraft liner and on the inside with 33 lb. Clupak paper was tested in direct compression. It carried a load of 6,000 lbs. without failing. A similar box was submerged in water for three days and then tested. It carried a load of 5,000 lbs. without failing. Another box of tomato box size when tested dry carried a load of 4,500 lbs. without failing. When tested after three days under water it carried a load of 4,000 lbs. without failing. The cleats were made of the same material as the box ends.

While the invention has been described thus far with the cleats fastened to the top end-flaps for distributing the weight of a superimposed container to the end veneers and in part to the side veneers, obviously the cleats can alternatively be applied to the top side-flaps for distributing such a load to the side veneers and in part to the veneer ends. The words "end-flaps" and "side-flaps" are used herein and in the appended claims interchangeably.

Although the invention has been described in some detail by way of illustration and example for purposes of clarity of understanding, it is understood that certain changes and modifications may be practiced within the spirit of the invention as limited only by the scope of the appended claims.

What is claimed is:

1. A container comprising, in combination, wall members substantially defining a hollow rectangular parallelepiped whose sides and ends include a wood veneer with the grain of the veneer running from the bottom to the top, an outer fiber liner bonded to the outer surface of the side and end-veneers and foldable over the top and bottom end-grain surfaces of said side and end-veneers to form overlapping end and side-flaps on both the top and bottom of the container, said top including a pair of wooden cleats with each of said cleats overlying at least a substantial portion of the top end-grain surface of one end-veneer and at least a substantial portion of part of the top end-grain surface of each side-veneer whereby a plurality of such containers can be stacked one on top of another and the load imposed upon each container by the containers placed thereabove is transmitted to the end and side veneers of that container by means of the cleats.

2. The container in accordance with claim 1 characterized further in that said liner is a heavy paper and each of said cleats is secured to the top surface of one of the top end-flaps.

3. The container in accordance with claim 1 characterized further in that each of said cleats is secured to the top surface of one of the top end-flaps and a portion of each of said cleats extends outwardly beyond the outer surface of the end veneer adjacent thereto.

4. The container in accordance with claim 1 characterized further in that said top includes a lid having a covering portion coextensive with the area at the top of the container and a perimeter portion projecting downwardly, said cleats being secured to the covering portion of said lid.

5. The container in accordance with claim 1 including a pair of cleats located on the bottom of the container and secured to the bottom end-flaps, each bottom cleat extending between the sides of the container from substantially the outer surface of one of the side veneers to substantially the outer surface of the veneer of the opposite side, and spaced from the closest end veneer by a distance greater than the distance which the top cleat at such end veneer projects inwardly, whereby a plurality of such containers can be stacked one on top of the other with the bottom cleats on one container nesting in between the top cleats on the container located therebelow.

References Cited by the Examiner

UNITED STATES PATENTS

| 1,482,727 | 2/1924 | Borchers | 229—31 X |
| 2,064,488 | 12/1936 | Neely | 229—23 |
| 2,071,962 | 2/1937 | Babcock | 217—12 |
| 2,693,894 | 11/1954 | Elmendorf | 217—17 |
| 3,197,108 | 7/1965 | Northway | 229—23 |
| 3,237,839 | 3/1966 | Wiley | 229—23 |

GEORGE O. RALSTON, *Primary Examiner.*